United States Patent
Vogel

(10) Patent No.: US 6,860,534 B2
(45) Date of Patent: Mar. 1, 2005

(54) LOADER/UNLOADER WITH SELECTIVELY ACTUATABLE SUCTION ELEMENTS

(75) Inventor: Klaus Vogel, Kirschau OT Rodewitz (DE)

(73) Assignee: Trumpf Sachsen GmbH, Neukirch (DE)

(*) Notice: Subject to any disclaimer, the term of this patent is extended or adjusted under 35 U.S.C. 154(b) by 178 days.

(21) Appl. No.: 10/283,700

(22) Filed: Oct. 30, 2002

(65) Prior Publication Data

US 2003/0080575 A1 May 1, 2003

(30) Foreign Application Priority Data

Oct. 31, 2001 (DE) .......................................... 101 53 784
Feb. 28, 2002 (EP) .............................................. 02004576

(51) Int. Cl.[7] .................................................. B25J 15/06
(52) U.S. Cl. ........................................ 294/65; 294/64.1
(58) Field of Search ............................... 294/64.1–64.3, 294/65; 901/40; 414/637, 727, 752.1; 271/91; 269/21

(56) References Cited

U.S. PATENT DOCUMENTS

| | | | | |
|---|---|---|---|---|
| 4,793,657 A | * | 12/1988 | Mense | .......................... 294/65 |
| 5,609,377 A | * | 3/1997 | Tanaka | .......................... 294/65 |
| 6,055,895 A | | 5/2000 | Kanazawa | |
| 6,131,973 A | * | 10/2000 | Trudeau et al. | ................ 294/65 |
| 6,364,387 B1 | * | 4/2002 | Bolotin et al. | .............. 294/64.1 |
| 6,439,631 B1 | * | 8/2002 | Kress | ........................... 294/65 |

FOREIGN PATENT DOCUMENTS

| | | |
|---|---|---|
| DE | 3234216 A1 | 3/1984 |
| DE | 3628381 A1 | 2/1988 |
| DE | 3637567 A1 | 5/1988 |
| DE | 19645186 A1 | 5/1998 |
| EP | 0 348 311 | 12/1989 |
| FR | 2 217 248 | 9/1974 |
| FR | 2 634 335 | 5/1990 |
| GB | 2 322 089 | 6/1998 |

* cited by examiner

Primary Examiner—Dean J. Kramer

(57) ABSTRACT

A workpiece loading apparatus has a large number of selectively targetable suction grips (4) provided in a divided suction grip array (17, 18) which suction is subdivided into individually addressable, mutually intersecting columns (1) and rows (2). All suction grips (4) are associated with dedicated control pistons (5) all of which can be moved into an idle position or an operating position upon the release of a lock latch (16). Each control piston (5) is assigned to the point of intersection (3) of a particular column (1) and row (2) and is selectably held in its idle position or locked in an operating position. The idle positions can be sequentially unlocked row by row (2) and the operating positions of the control pistons (5) can be addressed by columns (1) and then locked by rows (2). Once all rows (2) have been set, the suction grips (4) can be activated into the pick-up mode or deactivated by the control pistons (5).

8 Claims, 5 Drawing Sheets

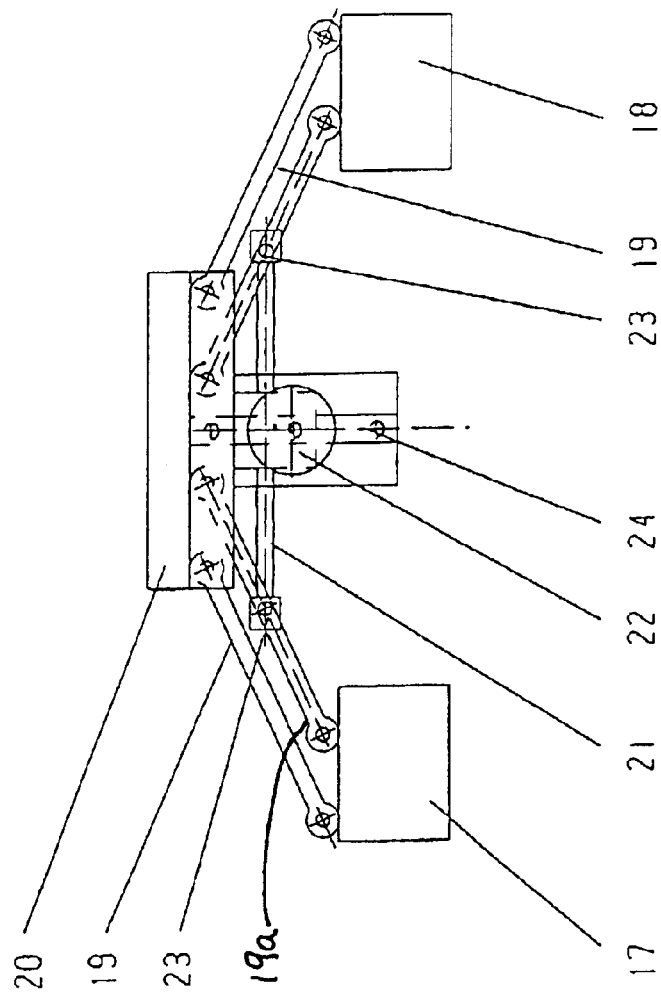
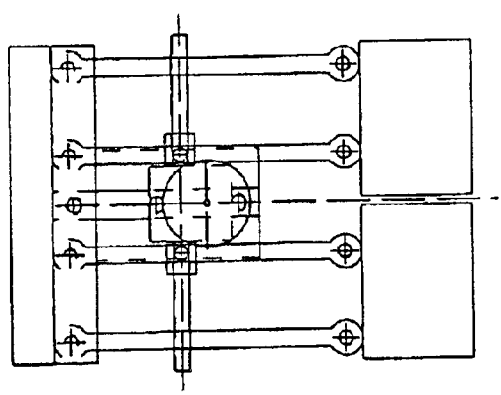
Fig. 3a
Fig. 3b

LOADER/UNLOADER WITH SELECTIVELY ACTUATABLE SUCTION ELEMENTS

BACKGROUND OF THE INVENTION

This invention relates to apparatus for loading flat workpieces and for sorting and transporting finished parts cut from a flat workpiece using selectively targetable suction grip control.

Suction grip loading systems for transporting flat workpieces such as sheet metal to a punch press or similar processing machine and/or for depositing them on a machine tool platform have been known as seen in German Patent No. 3637567. They combine individual suction grippers into a frame-mounted suction grip array. Retrieval of the finished parts from the residual sheet is performed manually.

German Offenlegungschift 3234216 describes a method for the unloading of processing machines in which the base position of the workpiece holder is shifted relative to the pick-up unit so that all suction grips line up with surfaces of the respective finished parts. Where larger batches of identical parts are involved, it is necessary, prior to the operating cycle, to manually arrange the individual suction grips within the suction grip array so that, for the unloading steps they are aligned in the correct position.

German Patent 3 628 381, describes a suction grip array in which the suction grips are arranged in parallel rows attached to tubular vacuum lines. By valves each vacuum line can be individually controlled, allowing the suction grip array to be adjusted in terms of its width or in adaptation to the weight of the workpiece. However, no provision is made for the selective retrieval of finished parts and, if it were made, it would be possible only by row but not within a row.

Similar functionality is offered by a device for holding a printed circuit board as described in German Patent 19646186. In this case, the suction grip array is subdivided by a template mounted in front of the vacuum passages so that only those suction grips are activated that make contact with smooth finished part surfaces. A changeover to another product requires a rearrangement of the grips and/or a change of the template. Unloading with a change in the cutting program from one workpiece to another corresponding to the finished-part distribution is possible only with a substantial manual effort.

It has also been possible to selectively control and activate individual suction grips in cases involving a small number of suction grips. The smaller the size of the finished parts punched from a large sheet of material, the smaller and more numerous the suction grips must be, making this individual control approach uneconomical, complex and excessively material intensive.

It is the objective and purpose of this invention to provide a novel loading system permitting selectively targetable, simple, easily manageable suction grip control within an array of a large number of suction grips, allowing the transport and sorting of both large workpieces and small finished parts, designed to operate in easily manageable fashion and cost effectively by virtue of low material requirements, and employing a modular control system that permits easy interchanging of the control elements.

SUMMARY OF THE INVENTION

It has now been found that the foregoing and related objects may be readily attained in a workpiece loading apparatus with selectively targetable suction grip control for a suction grip array comprising a multiplicity of suction grips, providing a divisible suction grip array subdivided into mutually intersecting, individually addressable columns and rows. An individually dedicated control piston is provided for each suction grip, and a lock latch is associated with each piston allowing all pistons to be reset into an idle position by the release of the lock latch or locked in an operating position. A piston guide is provided in which the piston is slidable between the idle and operating positions.

Control means is connected to the guides for effecting movement of said latch and of the piston. As a result, the control piston assigned to a particular column and row intersection can be selectively held in its idle position or locked in an operating position, and the idle positions in the rows can be consecutively unlocked while the operating positions of the control pistons can be addressed in the columns. The rows can be locked again, and, upon the setting of all rows of the suction grip array, the suction grips can be activated into the pick-up mode by the control pistons that are in their operating positions and they can be deactivated by a blow-off function by the control pistons that are in their idle positions.

Each suction grip is associated with a control piston moving within the guide, and all guides are connected to a reset line acting on one end of the control piston. They are also connected to a vacuum suction line and to a blow-off line. Each control piston is configured and provided with an internal conduit for selectable connection to the blow-off line or to the vacuum suction line. The latch will engage in recesses on the control piston for the two positions. A control line controlling the individual columns is connected to the other end of the control piston.

A modular control matrix is composed of a large number of identical columnar, square-profiled guides supporting at one end a suction grip or a connecting port therefor. The guides are being pressed together by clamping bars framing and delimiting the control matrix. The guides are provided with a longitudinal bore accommodating the control piston and have openings therein in the form of horizontal bores serving as inlets and outlets for control and operating media and transitioning into lines within the control matrix. The longitudinal bore above the control piston of each guide accommodates an insert providing a circular groove which matches a transverse bore and provides an axial bore. A perforation in the circular groove connects to a circular surface of the insert facing away from the control piston is covered by a gasket so that longitudinal bore is closed above the insert and the gasket to form a clearance space that connects to lateral bores.

Each suction grip is attached directly to the respective control piston. The operating medium supply line for the suction grip is controlled by the control pistons and is located in one part of the guide while the control head serving as a NAND element for the control piston is located in another part of the guide. The control head has a transverse bore that extends at a 90° angle of rotation relative to the other horizontal bores in the guide.

On one side of the control head providing the horizontal bores there is a horizontal groove connected by a perforation to the circular groove in the insert. The reset function for the control piston is triggered by applying a vacuum to the locking system and then to the column control system.

The suction grip array is divided into sub-arrays that can be pivoted relative to and separated from each other. The sub-arrays are attached to parallelogram rod assemblies between which a lead screw with two-directional pitch extends. It is respectively connected by a hinged nut to a rod of each parallelogram rod assembly, and a bi-directional drive motor gliding in a guide extends perpendicularly to the lead screw and is engaged therewith to effect its rotation.

The idle positions are unlocked consecutively row by row. As soon as the idle position in a row has been unlocked, the intended operating position of the control piston is activated, after which the row is locked. After all rows of the suction grip array have been set, the suction grip array is configured for the finished parts to be gripped, and the suction grips are activated for the pick-up by the control pistons that are in their operating position Building on the basic concept, the invention lends itself to the design of a modular control matrix for the loading system with selectively targetable suction grip control.

By activating the reset line and deactivating the compressed air locking line before a setting is configured, all control pistons in the control matrix are moved into their home position. This is followed by the application of compressed air on the locking line system while the gaskets are pressed against the inserts, thus holding the control pistons in their home position. Row-by-row cancellation of the pressure in the locking line system and selective column-by-column pressurization of the control line system causes the gaskets of the selected control pistons to be lifted and these pistons to be moved from their home position into their second or operating position where they are held in place by the activation of the locking line for the row concerned.

BRIEF DESCRIPTION OF THE DRAWINGS

The following description of an implementation example will explain this invention in more detail with the aid of the attached drawings in which:

FIG. 3a is a side elevational view of the division of a suction grip array;

FIG. 3b is a similar view with the suction grips moved into an extended position;

DETAILED DESCRIPTION OF THE ILLUSTRATED EMBODIMENT

Figure 1:
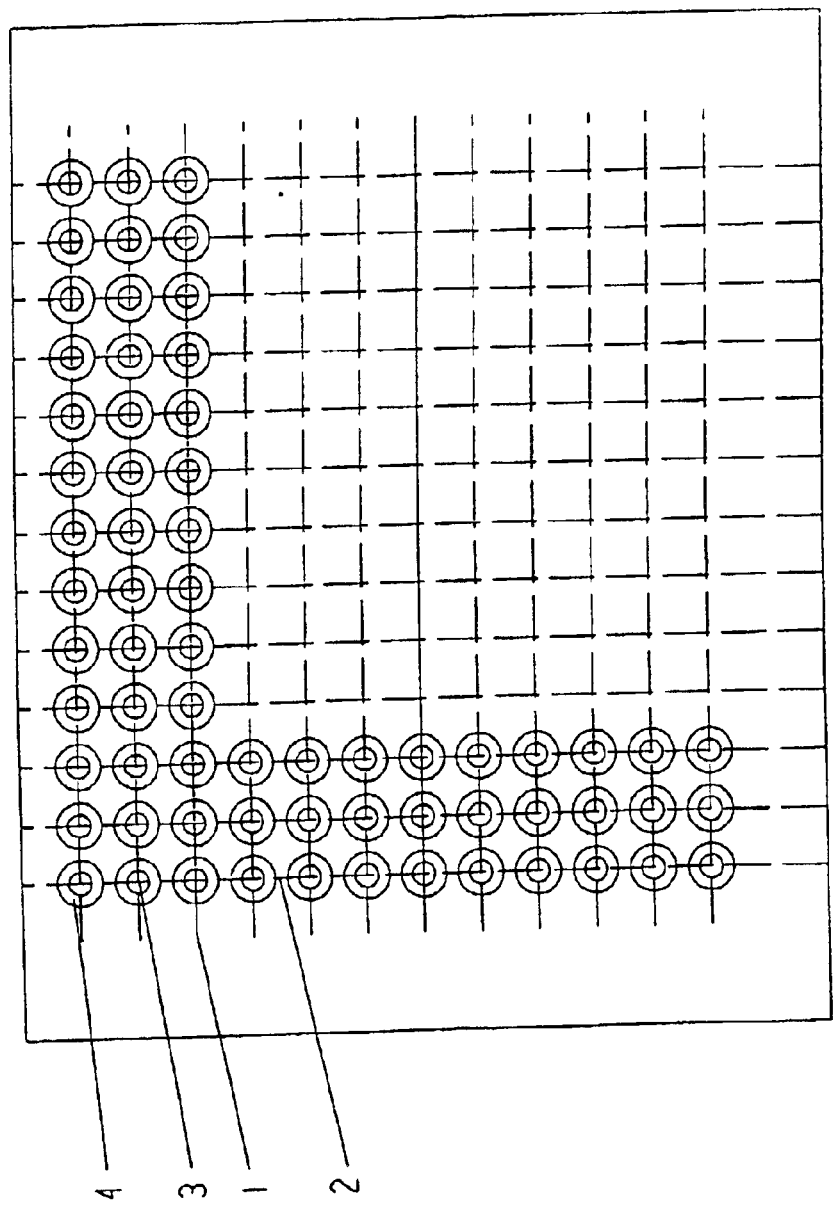
FIG. 1 shows the column and row pattern of a suction grip array employed in the present invention.

Turning first to FIG. 1, the suction grip array therein illustrated is composed of columns 1 and rows 2 disposed at a right angle to the columns 1. A suction grip 4 is positioned at each point of intersection 3 between the columns 1 and the rows 2.

Figure 2:
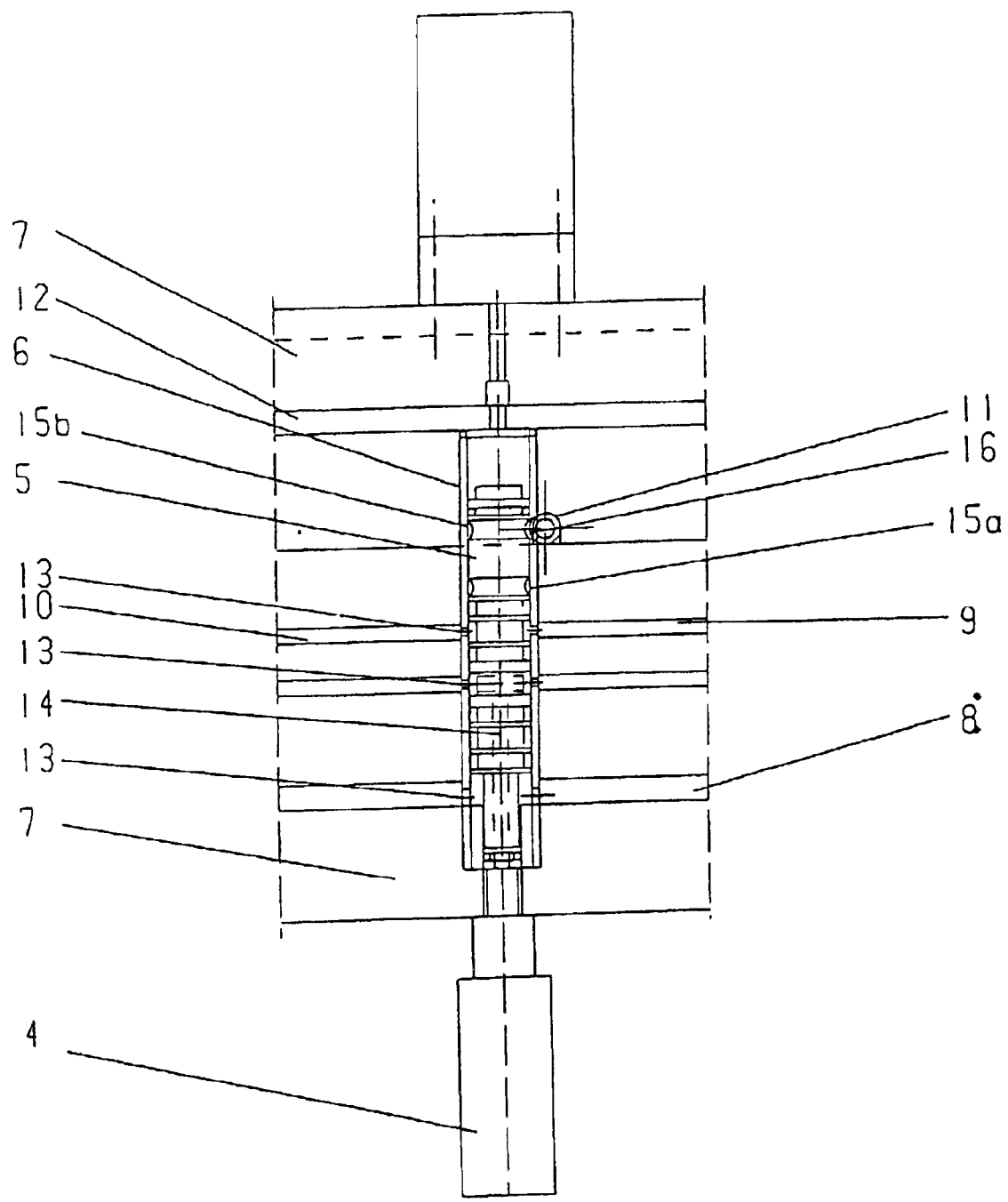
FIG. 2 is a cross sectional view of the control piston used for each suction grip.

Associated with each suction grip 4 is a control piston 5, shown in section in FIG. 2 and moving within the guide 6. The suction grips 4 are mounted on a support unit 7 which houses the guides 6 in which are slidably supported the control pistons 5. The support unit 7 also accommodates the reset lines 8, the vacuum suction lines 9, the blow-off lines 10, the locking lines 11 and the control lines 12 to which the guides 6 are connected by the inlet ports 13.

Located in the control piston 5 is an internal conduit 14 that can be selectably connected to the vacuum suction line 9 or to the blow-off line 10. The control piston 5 further features two recesses 15a and 15b in which is engaged a lock latch 16 operated by the locking line 11, or, alternatively, the locking line 11 itself, since it may have an expandable wall. The locking lines 11 extend in a direction parallel to the rows 2, and the control lines 12 run parallel to the columns 1 in the suction grip array.

Before the suction grip array is set, all locking lines 11 are simultaneously energized so as to release the lock latches 16. Activating the reset line 8 moves all control pistons 5 into their idle position shown in FIG. 2 and the lock latches 16 engage in the recesses 15a. This is followed by the sequential activation of the locking lines 11. At the same time, each control line 12 is subjected to control pressure, or to no pressure, or to negative pressure. The control lines 12 of the row receiving control pressure push the control pistons 5 into their operating position, in which the lock latches 16 engage in the recesses 15b. The other control pistons 5 in this particular, unlocked row 2 remain in their idle position, with the latches 16 engaging in the recesses 15a upon progression to the next row 2.

Once all locking lines 11 of all rows have been configured, the suction grip array is set for operation. The control pistons 5 that are in their operating position connect the suction grips 4 to the vacuum line 9 by the internal conduit 14. The control pistons 5 that are in their idle position connect the suction grips 4 to the blow-off line 10 by the internal conduit 14.

To permit the movement of larger workpieces using the suction grip array, the latter can be divided into partial or sub-arrays 17 and 18 as shown in FIG. 3. These sub-arrays 17 and 18 are movably attached to parallelogram rod assemblies 19 which are pivotably mounted on a gantry 20. Extending between the parallelogram rod assemblies 19 is a lead screw 21 on which a drive motor 22 is centered. The two shaft portions of the lead screw 21, positioned next to the drive motor 22, have a mutually opposite pitch, and they are threadably engaged in the nuts 23 that are pivotably supported on a rod 19a of the parallelogram rod assembly 19. The drive motor 22 slides along a guide 24 in a direction perpendicular to the axis of lead screw 21.

Rotation of the lead screw 21 moves the nuts 23 axially on the lead screw 21 and pivots the parallelogram rod assembly 19 as the drive motor 22 slides along the guide 24. The sub-arrays 17 and 18 swing toward or away from each other depending on the direction of rotation of the lead screw 21 effected by the reversible motor 22.

Figure 4:
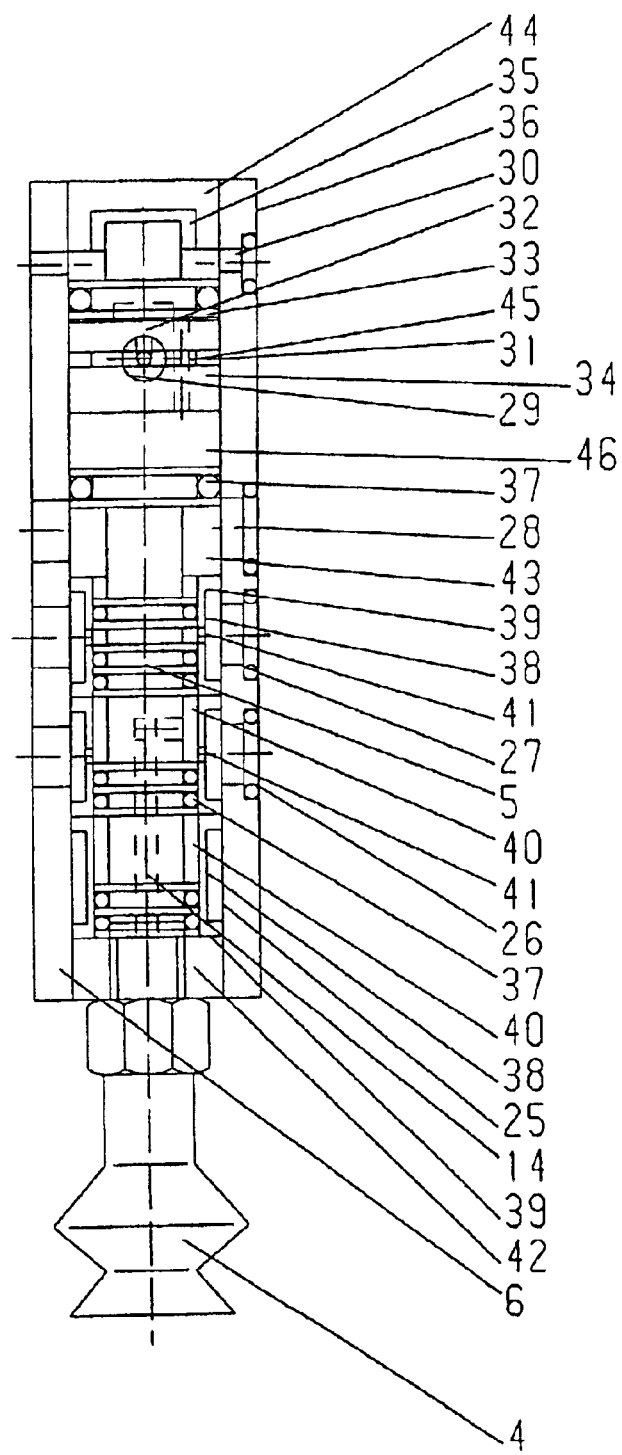
FIG. 4 is a longitudinal sectional view of a guide in the modular control matrix.
Figure 5:
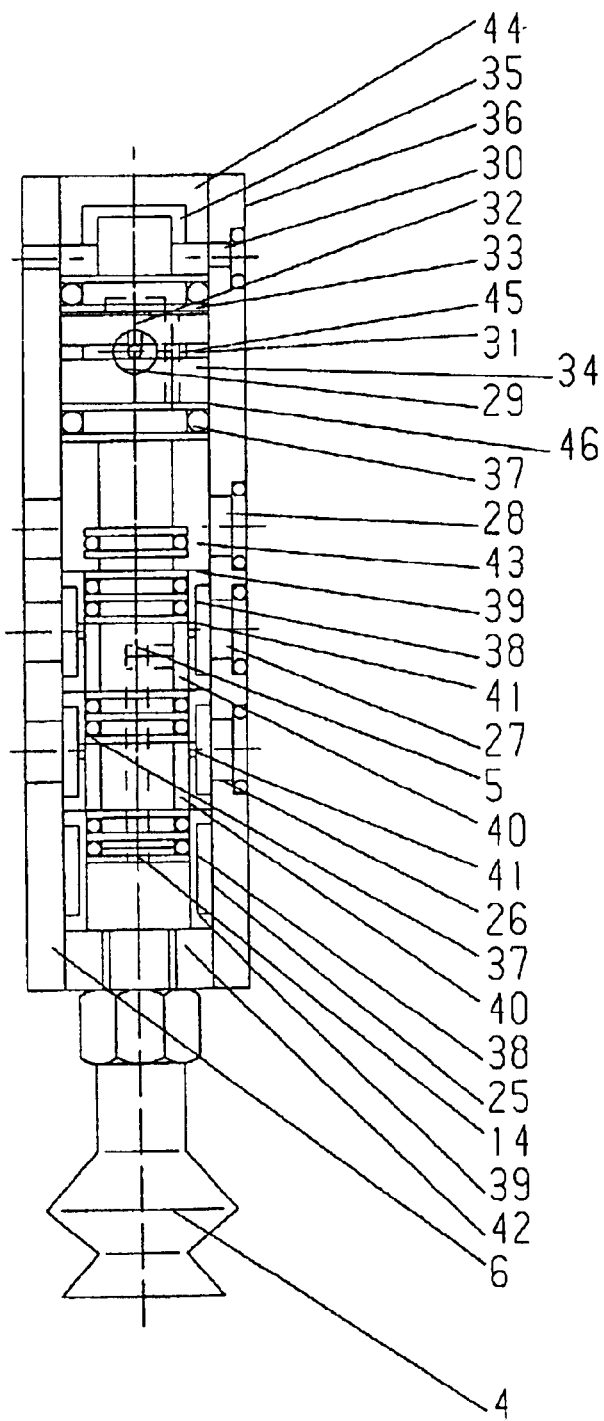
FIG. 5 is a similar view with the piston of the guide in its alternate position.

The modular control matrix as shown in FIGS. 4 and 5 are composed of a multiplicity of identical columnar, square profiled guides 6 that are pressed together by clamping bars (not shown) delimiting the control matrix. All guides 6 are integrated into the support unit 7, and each guide 6 is located above points of intersection 3 of columns 1 and rows 2 in the suction grip array. Each guide 6 has a longitudinal bore 25 that accommodates a control piston 5. O-rings 37 on the control piston 5 seat snugly against seats 39 provided with external ring grooves 38, and a free piston chamber 40 is created between the O-rings 37. The seats 39 are located in the guide 6 in front of horizontal bores 26 and 27 for the operating medium, and connecting passages 41 extend inwardly from the external grooves 38. At its bottom end the longitudinal bore 25 is closed by a circular insert 42 which supports a suction grip 4.

The control piston 5 contains the internal conduit 14 that connects the piston chamber 40 with the suction grip 4. Located above the horizontal bores 26 and 27 is a reset line bore 28 that serves to connect an upper reset piston chamber 43 to a reset system. Above the control piston 5, the guide 6 transitions into a control head 36. The transverse bore 29, constituting the only opening on the free side of the guide 6, extends at a 90° angle of rotation relative to the horizontal bores 26, 27 and 28.

The control head 36 consists of an insert 34 in the longitudinal bore 25, a gasket 33 disposed on the insert 34, and a cap 44 for closing off the longitudinal bore 25. The insert 34 is provided with a circular groove 31 that is aligned with the horizontal bore 29. The insert 34 has a longitudinal bore 45 that connects to a piston displacement chamber 46 above the control piston 5. From the circular groove 31 a passage 32 leads to the surface of the insert 34 that is covered by the gasket 33. Located above the gasket 33 is a clearance space or chamber 35 into which extend lateral bores 30 in the guide 6.

Prior to the setting of the individual suction grips 4 for pick-up or blow-off functions, the reset system is activated by the reset line bore 28 to move all control pistons 5 into their home position. To that effect, deactivating the locking system by the lateral bores releases all lock latches 16. Thereupon, by applying pressure to all lateral bores 30, the gaskets 33 are pushed against the inserts 34, to hold all control pistons in their home position.

Next, the control pistons 5 are set by a row-by-row cancellation of the locking function in the control matrix and simultaneous application of control pressure in selected columns by the transverse bore 29. By the circular groove 31 and the perforation 32, this control pressure lifts the gasket 33 in the selected control head 36, pushing the control piston 5 along the longitudinal bore 45 from its home position into its second i.e., operating position in which, through the subsequent application of pressure on the lateral bores 30, the control piston 5 in held in place in the row concerned.

As will be readily appreciated, the workpiece loading assembly of the present invention is conveniently operated by the computer numeric control of the machine tool with which it is associated. The data on the X-Y coordinates of the workpiece or parts on the worktable are utilized to identify the appropriate suction grips in the array to be activated as described hereinbefore and the values controlling the several control lines to the suction grips and motors can be actuated thereby to grip the workpiece or parts and then to release them after the desired movement of the assembly by the transport mechanism of the loading apparatus.

Thus, it can be seen from the foregoing detailed description and attached drawings that the novel workpiece loading apparatus of the present invention enables facile orientation and actuation of the suction grips of a large array to provide versatility and rapid operation.

Having thus described the invention, what is claimed is:

1. A workpiece loading apparatus with selectively targetable suction grip control for a suction grip array comprising:
   (a) a multiplicity of suction grips (4), providing a divisible suction grip array (17,18) subdivided into mutually intersecting, individually addressable columns (1) and rows (2);
   (b) an individually dedicated control piston (5) for each suction grip;
   (c) a lock latch (16) associated with each piston (5) allowing all pistons (5) to be reset into an idle position by the release of the lock latch (16) or locked in an operating position;
   (d) a piston guide (6) in which said piston (5) is slidable between the idle and operating positions; and
   (e) control means connected to said guides for effecting movement of said latch and of said piston, whereby (i) the control piston (5) assigned to a particular column (1) and row (2) intersection (3) can be selectively held in its idle position or locked in an operating position, (ii) the idle positions in the rows (2) can be consecutively unlocked while the operating positions of the control pistons (5) can be addressed in the columns (1), and (iii) the rows (2) can be locked again, and wherein, upon the setting of all rows (2) of the suction grip array (17, 18) the suction grips (4) being coupled to a vacuum suction line (9) and thereby activated into a pick-up mode by the control pistons (5) that are in their operating positions and they can be deactivated by a blow-off function by the control pistons (5) that are in their idle positions, each suction grip (4) being associated with a control piston (5) moving within a guide (6), all of said guides (6) being connected to a reset line (8) acting on one end of the control piston (5), to said vacuum suction line (9), and to a blow-off line (10), each control piston (5) being configured and provided with an internal conduit (14) for selectable connection to the blow-off line (10) or to the vacuum suction line (9), whereby the latch (16) engages in recesses (15a, 15b) on the control piston (5), and wherein a control line (12) controlling the individual columns (1) is connected to the other end of the control piston (5).

2. The workpiece apparatus in accordance with claim 1 wherein a modular control matrix is composed of a large number of identical columnar, square-profiled guides (6) supporting at one end a suction grip (4) or a connecting port therefor, said guides (6) being pressed together by clamping bars framing and delimiting the control matrix, said guides (6) being provided with a longitudinal bore (25) accommodating the control piston (5), said guides having openings therein in the form of horizontal bores (26, 27, 28, 29, 30) serving as inlets and outlets for control and operating media and transitioning into lines within the control matrix, the longitudinal bore (25) above the control piston (5) of each guide (6) accommodating an insert (34) providing a circular groove (31) which matches a transverse bore (29) and providing an axial bore and having a perforation (32) in the circular groove (31) connecting to a circular surface of the insert (34) facing away from the control piston (5) and covered by a gasket (33), said longitudinal bore (25) being closed above the insert (34) and the gasket (33) to form a clearance space (35) that connects to lateral bores (30).

3. The workpiece apparatus in accordance with claim 2 wherein each suction grip (4) is attached directly to the respective control piston (5).

4. The workpiece apparatus in accordance with claim 2 wherein the operating medium supply line for the suction grip (4), controlled by the control pistons (5), is located in one part of the guide (6) while the control head (36) serving as a NAND element for the control piston (5) is located in another part of the guide (6), and wherein the control head (36) has a transverse bore (29) that extends at a 90° angle of rotation relative to the other horizontal bores (26, 27 and 28) in the guide (6).

5. The workpiece apparatus in accordance with claim 2 wherein that on one side of the control head (36) providing the horizontal bores (26, 27 and 28) has a horizontal groove connected by a perforation to the circular groove (31) in the insert (34).

6. The workpiece apparatus in accordance with claim 2 wherein the reset function for the control piston (5) is triggered by applying a vacuum to the locking system and then to the column control system.

7. A workpiece loading apparatus with selectively targetable suction grip control for a suction grip array comprising:

(a) a multiplicity of suction grips (4), providing a divisible suction grip array (17, 18) subdivided into mutually intersecting, individually addressable columns (1) and rows (2), said suction grip array (17, 18) being divided into sub-arrays (17), (18) that can be pivoted relative to and separated from each other;

(b) an individually dedicated control piston (5) for each suction grip;

(c) a lock latch (16) associated with each piston (5) allowing all pistons (5) to be reset into an idle position by the release of the lock latch (16) or locked in an operating position;

(d) a piston guide (6) in which said piston (5) is slidable between the idle and operating positions; and (e) control means connected to said guides for effecting movement of said latch and of said piston, whereby (i) the control piston (5) assigned to a particular column (1) and row (2) intersection (3) can be selectively held in its idle position or locked in an operating position, (ii) the idle positions, in the rows (2) can be consecutively unlocked while the operating positions of the control pistons (5) can be addressed in the columns (1), and (iii) the rows (2) can be locked again, and wherein, upon the setting of all rows (2) of the suction grips array (17, 18) the suction grips (4) can be coupled to a vacuum suction line (9) and thereby activated into a pick-up mode by the control pistons (5) that are in their operating positions and they can be deactivated by a blow-off function by the control pistons (5) that are in their idle positions.

8. The workpiece apparatus in accordance with claim 7 wherein the sub-arrays (17,18) are attached to parallelogram rod assemblies (19) between which a lead screw (21) with two-directional pitch extends, and is respectively connected by a hinged nut (23) to a rod of each parallelogram rod assembly (19), and wherein a bi-directional drive motor (22) gliding in a guide (24) extends perpendicularly to the lead screw (21) and is engaged therewith to effect its rotation.

* * * * *